US 6,734,786 B2

(12) United States Patent
Hoholik

(10) Patent No.: US 6,734,786 B2
(45) Date of Patent: May 11, 2004

(54) LINE GUIDE

(76) Inventor: Thomas Hoholik, 135 Chippewa Ave., Manistique, MI (US) 49854

( * ) Notice: Subject to any disclaimer, the term of this patent is extended or adjusted under 35 U.S.C. 154(b) by 151 days.

(21) Appl. No.: 09/918,207

(22) Filed: Jul. 30, 2001

(65) Prior Publication Data

US 2003/0019117 A1 Jan. 30, 2003

(51) Int. Cl.⁷ .................................................. B60Q 1/00
(52) U.S. Cl. .................... 340/425.5; 340/435; 340/436; 340/686.2; 33/264; 116/28 R
(58) Field of Search ............................ 340/425.5, 435, 340/436, 458, 932.2, 437, 686.2, 686.6; 33/264, 263; 116/28 R, 30, 264; 73/178 R; 362/540, 459, 482

(56) References Cited

U.S. PATENT DOCUMENTS

| 1,429,166 A | 10/1922 | Rommer |
| 1,871,532 A | 8/1932 | Kenna |
| 2,360,368 A | 10/1944 | Rubissow |
| 3,199,487 A | 8/1965 | Heinkel |
| 3,434,214 A | 3/1969 | Pratt |
| 3,834,036 A | 9/1974 | Scarritt, Sr. |
| 3,901,536 A | 8/1975 | Black |
| 4,016,653 A | * 4/1977 | Bartlett ...................... 116/28 R |
| 4,079,519 A | 3/1978 | Carmouche |
| 4,677,753 A | 7/1987 | Loggers |
| 5,052,113 A | 10/1991 | Aquino |
| 5,089,803 A | 2/1992 | Bohn |
| 5,949,329 A | 9/1999 | Woodard |
| 6,142,013 A | * 11/2000 | Gray ......................... 73/178 R |
| 6,345,586 B1 | * 2/2002 | Okada ....................... 116/28 R |
| 6,499,869 B1 | 12/2002 | Southworth ................. 362/504 |

* cited by examiner

Primary Examiner—Davetta W. Goins
(74) Attorney, Agent, or Firm—Price, Heneveld, Cooper, DeWitt & Litton, LLP

(57) ABSTRACT

A driving assistance device for a vehicle that includes a housing having a left rod, a center rod and a right rod extending from the housing attached to the vehicle. Each of the rods are parallel and having a light source at an end thereof. Electrical wiring is located within the housing and the rods for connecting the light sources to a power source for illuminating the light sources. When the right rod overlaps a lane marker of a road, the vehicle is too close to the lane marker. When the left rod overlaps the lane marker of the road, the vehicle is too far away from the lane marker. Additionally, when the center rod overlaps the lane marker of the road, the vehicle is in the proper position. Therefore, the driving assistance device allows a driver of the vehicle to properly align the vehicle on the road.

44 Claims, 3 Drawing Sheets ns
LINE GUIDE

BACKGROUND OF THE INVENTION

The present invention relates to a driving assistance device that can be used to assist a driver in positioning a vehicle within a lane of traffic.

Maintaining a vehicle in a proper and safe position in a lane of a road can be very difficult, especially when the vehicle is a semi-trailer having a long trailer. Although vehicles are equipped with a rear view mirror and side mirrors, it can sometimes be difficult for the driver to take his line of vision away from the road in front of the driver to look at the mirrors. In the semi-trailer situation, the driver of the semi-trailer sometimes does not even have a rear view mirror. Positioning the vehicle can be even more difficult when the road is under construction because the lanes are usually more narrow in this situation and the driver of the vehicle typically does not have enough time to look into the mirrors to determine his position.

Accordingly, an apparatus for assisting a driver of a vehicle in maintaining the vehicle in the proper position on the road is desired.

SUMMARY OF THE INVENTION

The present invention comprises a driving assistance device including a housing with a left rod, a center rod and a right rod extending from the housing. When the right rod overlaps a lane marker of a road, the vehicle is too close to the lane marker. The driver of the vehicle knows to move the vehicle away from the lane marker. When the left rod overlaps the lane marker of the road, the vehicle is too far away from the lane marker. The driver of the vehicle knows to move the vehicle towards the lane marker. When the center rod overlaps the lane marker of the road, the vehicle is in the proper position.

Accordingly, the driving assistance device of the present invention allows a driver of the vehicle to know the position of the vehicle in the road. Furthermore, the driver of the vehicle will know in what direction to move to vehicle if the vehicle is not in the proper position on the road. The driver will know where the vehicle is positioned and where to move the vehicle without looking in any of the mirrors on the vehicle. The driving assistance device is efficient in use, economical to manufacture, capable of a long operable life, and particularly adapted for the proposed use.

These and other features, advantages, and objects of the present invention will be further understood and appreciated by those skilled in the art by reference to the following specification, claims and appended drawings.

DETAILED DESCRIPTION OF THE PREFERRED EMBODIMENTS

Figure 1:
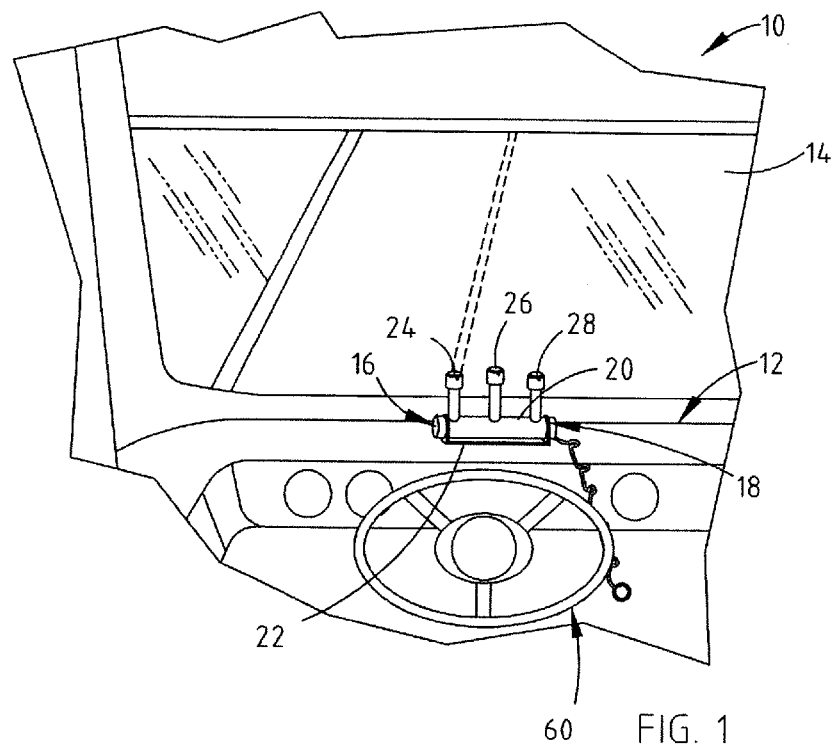
FIG. 1 is an interior view of a vehicle with a driving assistance device of the present invention on a dashboard of the vehicle.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
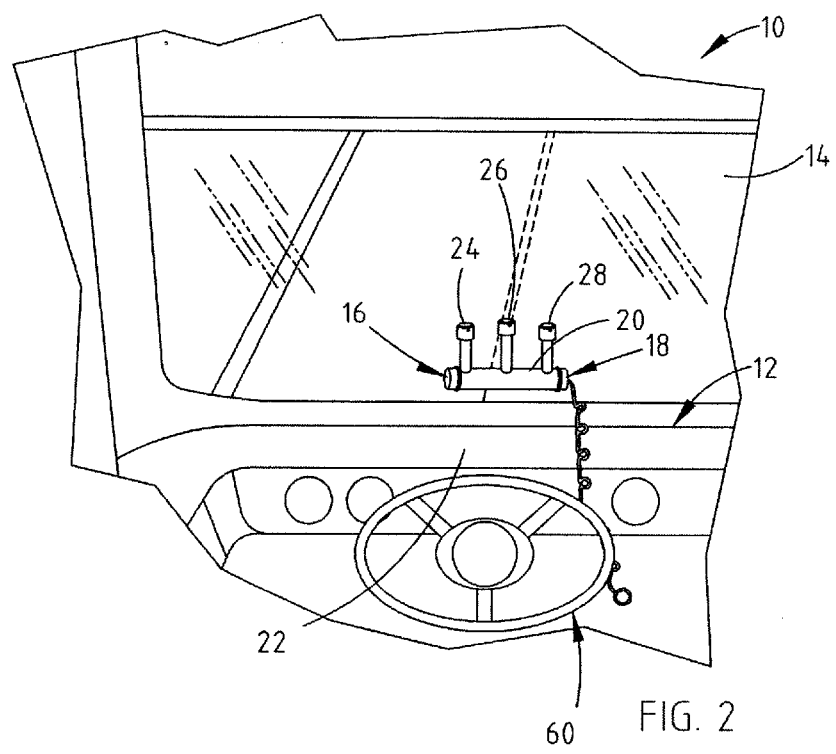
FIG. 2 is an interior view of the vehicle with the driving assistance device of the present invention on a windshield of the vehicle.

The reference number 10 (FIG. 1) generally designates a vehicle embodying the present invention. In the illustrated example, the interior 11 of the vehicle 10 includes a dashboard 12 and a windshield 14. The vehicle 10 includes a driving assistance device 16 having a housing 18 with a top surface 20 and a bottom surface 22. The bottom surface 22 of the housing 18 is configured to be connected to the dashboard 12 (FIG. 1) or the windshield 14 (FIG. 2) of the vehicle 10. A left rod 24, a center rod 26 and a right rod 28 extend from the top surface 20 of the housing 18, with the rods 24, 26 and 28 being parallel. When the right rod 28 overlaps a lane marker 32 of a road 34, the vehicle 10 is too close to the lane marker 30 (see FIG. 5). Furthermore, when the left rod 24 overlaps the lane marker 30 of the road 32, the vehicle 10 is too far away from the lane marker 30. Additionally, when the center rod 26 overlaps the lane marker 30 of the road 32, the vehicle 10 is in the proper position. Therefore, the driving assistance device 16 assists a driver of the vehicle 10 in properly aligning the vehicle 10 on the road 30.

Figure 3:
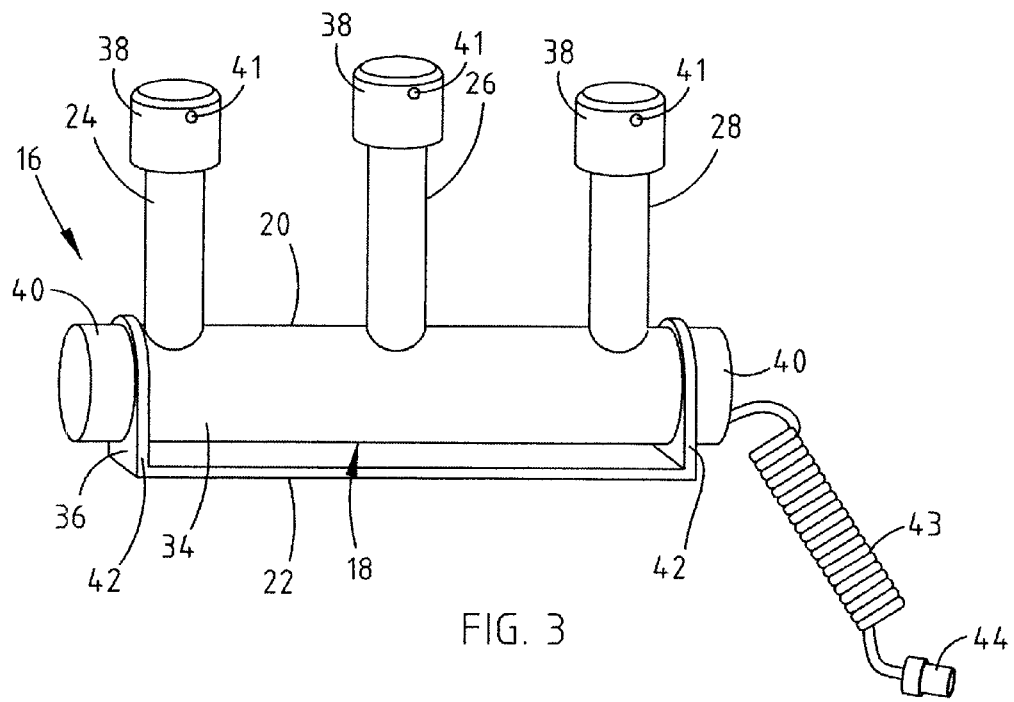
FIG. 3 is a perspective view of the driving assistance device of the present invention.
Figure 4:
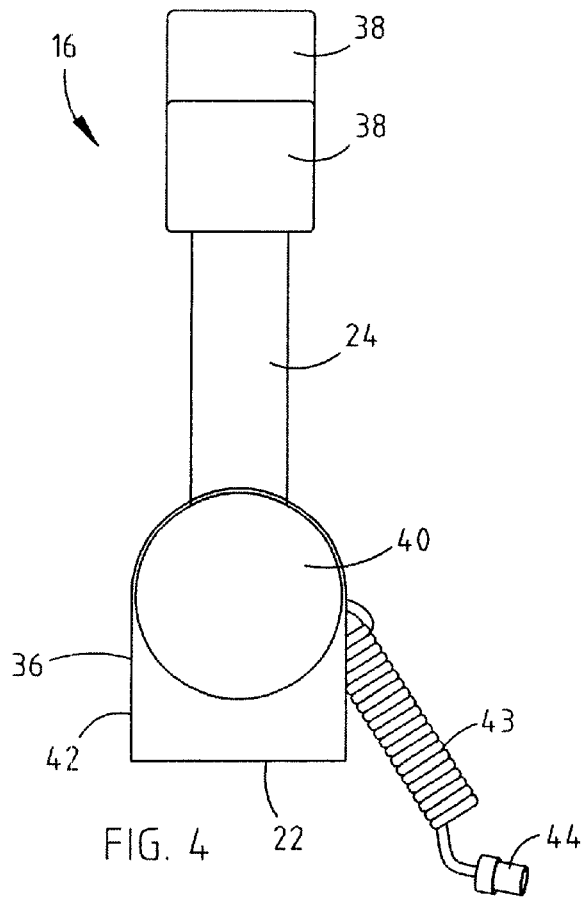
FIG. 4 is a front view of the driving assistance device of the present invention.

The illustrated driving assistance device 16 (FIGS. 3 and 4) includes the housing 18 with the left rod 24, the center rod 26 and the right rod 28 extending from the top surface 20 of the housing 18. The illustrated housing 18 is a cylindrical tube 34 with a U-shaped base 36 connected to ends of the tube 34. The housing 18 also includes a pair of end caps 40 screwed onto the ends of the tube 24 extending through legs 42 of the U-shaped base 36 to connect the U-shaped base 36 to the tube 34. The left rod 24, the center rod 26 and the right rod 28 extend from a top circumferential portion of the tube 34. Although the housing 18 is shown as being a tube 34 with a U-shaped base 36, it is contemplated that the housing 18 could have any geometric shape, including a unitary box. Therefore, the term top surface 20 as used herein includes any planar or non-planar surface. The U-shaped base 36 includes the bottom surface 22 connectable to the windshield 14 or the dashboard 12. It is also contemplated that the housing 18 could extend from the dashboard without a bottom surface directly connected to the dashboard.

In the illustrated example, the left rod 24, the center rod 26 and the right rod 28 extend from the top surface 20 of the housing 18. Each of the rods 24, 26 and 28 have an annular cross-section and a cap 38 attached to an end thereof. It is contemplated that the rods 24, 26 and 28 could have any geometric cross-section, including circular, square and triangular. When having an annular cross-section, the longitudinal axis of the left rod 24 is preferably spaced 2 inches from the longitudinal axis of the center rod 26, and the longitudinal axis of the center rod 24 is preferably spaced 2 inches from the longitudinal axis of the right rod 28. The caps 38 on the ends of the rods 24, 26 and 28 cover light sources located on the rods 24, 26 and 28. Each of the caps 38 includes a small aperture 41 that allows light from the light sources to exit the caps 38. The light sources can be powered by a cigarette lighter within the vehicle 10 or by batteries placed into the housing 18. Therefore, the housing 18 and the rods 24, 26 and 28 include wiring located therein that connects the light sources in the rods 24, 26 and 28 to the batteries or the cigarette lighter. If the light sources receive power from the cigarette lighter, the housing 18 will have a power cord 43 with a male plug 44 extending from the housing 18. The male plug 44 is adapted to be inserted into the cigarette lighter in the vehicle 10.

The illustrated driving assistance device 16 is used to properly position the vehicle 10 on the road 32 by first placing a left side 46 of a vehicle 10 adjacent any straight line. The left side 46 of the vehicle 10 can be the left side of the cab or the left side of the trailer if the vehicle 10 is a semi-trailer. For example, the straight line could be the lane maker 30 of the road 32 (FIG. 5) or any other straight surface or marker. The term lane marker 30 as used herein includes the center line of the road 32, a line dividing one side of the road 32 (i.e., the side with traffic traveling in the same direction in two or more lanes), a line separating a driving lane from a turn lane, a line dividing the driving lane from the shoulder or any other line used to define a lane. Furthermore, the term road 32 includes any surface upon which the vehicle 10 any travel. Once the vehicle 10 is positioned adjacent the straight line 30, a driver of the vehicle 10 aligns the right rod 28 to overlap the straight line 30, with the driver of the vehicle 10 maintaining a line of vision from where the driver's normal line of vision would be when the driver is driving the vehicle. The driver of the vehicle 10 could also position the driving assistance device 16 within the vehicle 10 by first placing a right side of the vehicle 10 adjacent any straight line 30 and then aligning the left rod 24 to overlap the straight line 30, with the driver of the vehicle 10 maintaining a line of vision from where the driver's normal line of vision would be when the driver is driving the vehicle. After the driving assistance device 16 has been properly aligned, a line across all of the rods 24, 26 and 28 should be perpendicular to the line of sight of the driver of the vehicle 10. The driver thereafter places the bottom surface 22 of the housing 18 onto the dashboard 12 or the windshield 14 of the vehicle 10 to connect the driving assistance device 16 to the vehicle 10.

The illustrated housing 18 of the driving assistance device 16 includes one of a hook type or a loop type fastener sold under the tradename Velcro® on the bottom surface 22 of the housing 18 for connecting the housing 18 to the dashboard 12 or windshield 14. If the bottom surface 22 includes one of the hook and loop type fasteners, a line should be drawn along the two legs 42 of the U-shaped base 36 of the housing 18 to mark the proper position of the housing 18. A complementary hook and loop type fastener in then attached to the dashboard 12 or the windshield 14 between the lines drawn on the dashboard 12 or the windshield 14 (preferably with the dashboard 12 or the windshield 14 cleaned with an alcohol pad first to clean the area between the lines). The housing 18 is then placed onto the dashboard 12 or the windshield 14 by mating the hook or loop type fastener on the bottom surface 22 of the housing 18 with the complementary hook or loop type fastener on the dashboard 12 or windshield 14. The housing 18 can also be attached to the windshield 14 or dashboard 12 with suction cups. The end caps 40 of the housing 18 are configured to be unscrewed to allow the tube 34 of the housing 18 to rotate relative to the U-shaped base 36 to allow the rods 24, 26 and 28 to always be vertical whether the driving assistance device 16 is connected to the if dashboard 12 or the windshield 14. The caps 40 are thereafter screwed onto the tube 34 to maintain the tube 34 and the U-shaped base 36 in the desired position. It is contemplated that the housing 18 could also be adhered to the dashboard 12 or windshield 14 by other means, including an adhesive. Additionally, the housing 18 could extend directly from the dashboard 12 or windshield 14.

Figure 5:
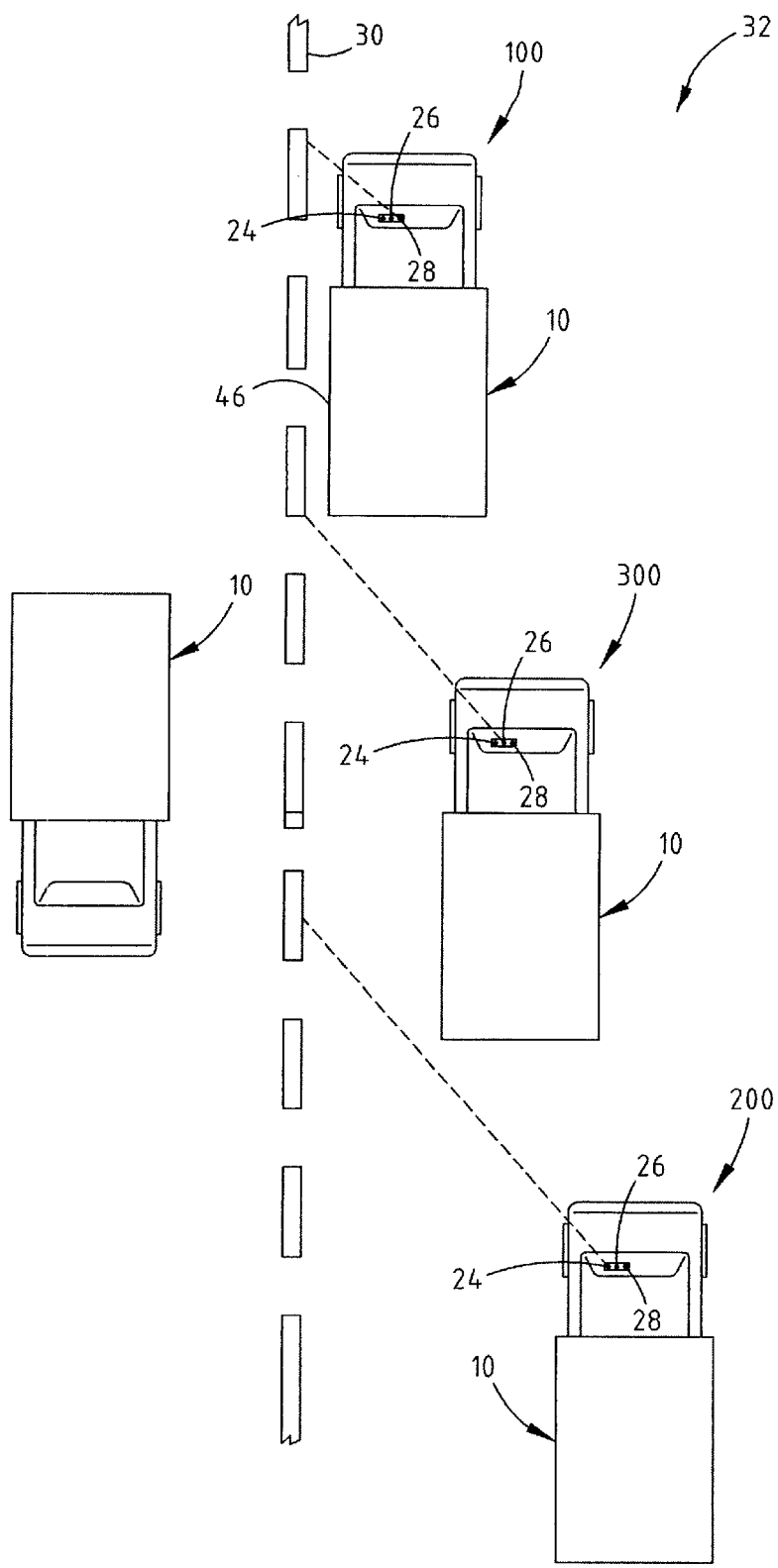
FIG. 5 is a top view of a road with vehicles having the driving assistance device of the present invention thereon.

In use, a driver of the vehicle 10 will be able to properly position the vehicle 10 within a lane 50 of the road 32 because, when the right rod 28 overlaps a lane marker 32 of a road 34, the vehicle 10 is too close to the lane marker 30 (100 in FIG. 5). The driver of the vehicle 10 will then know to rotate the steering wheel 60 (see FIG. 1) of the vehicle 10 clockwise to move the vehicle 10 away from the lane marker 30. Furthermore, when the left rod 24 overlaps the lane marker 30 of the road 32, the vehicle 10 is too far away from the lane marker 30 (200 in FIG. 5). The driver of the vehicle 10 will then know to rotate the steering wheel 60 of the vehicle 10 counter clockwise to move the vehicle 10 towards the lane marker 30. Additionally, when the center rod 26 overlaps the lane marker 30 of the road 32, the vehicle 10 is in the proper position (see FIG. 1 and 300 in FIG. 5). Preferably, the center rod 26 of the driving assistance device 16 is longer than the left rod 24 and the right rod 28 to draw more attention to the center rod 26. Accordingly, the center rod 26 preferably has a longitudinal length of 2.5 inches and the right rod 28 and the left rod 24 preferably have a longitudinal length of 2 inches. Furthermore, the rods 24, 26 and 28 preferably have a circular cross-section with a diameter of about 0.5 inches such that the rods 24, 26 and 28 and the lane marker 30 substantially overlap from the line of vision of the driver of the vehicle 10. Therefore, the driver of the vehicle 10 will then know to maintain the position of the steering wheel 60 to maintain the vehicle 10 in the proper position spaced from the lane marker 30 and a side 62 of the road 32 or a lane adjacent the lane in which the vehicle 10 is traveling.

When the driving assistance device 16 is used to properly align the vehicle 10 at nighttime, the driver of the vehicle 10 can use the light coming from the light source within the rods 24, 26 and 28 that exits out of the apertures 41 of the caps 38 on the ends of the rods 24, 26 and 28. The driver of the vehicle can look directly at the lights coming from the rods 24, 26 and 28 to align the vehicle or can position the driving assistance device 16 such that the light coming from the rods 24, 26 and 28 faces away from the driver. When the driving assistance device 16 is in the latter position, the light coming from the rods 24, 26 and 28 will reflect off of the windshield 14 to allow the driver of the vehicle 10 to properly align the vehicle 10. Preferably, the caps 38 of the rods 24, 26 and 28 are placed within one inch of the windshield 14, such that the reflection of the light coming from the rods 24, 26 and 28 is properly spaced. However, the caps 38 on the ends of the rods 24, 26 and 28 can be rotatable such that the light coming from the rods 24, 26 and 28 can be properly positioned to reflect off the windshield 14 with a proper spacing to allow the vehicle 10 to be properly positioned on the road 32.

Consequently, a driver of the vehicle 10 can use the driving assistance device 16 to properly align the vehicle 10 to the road 32 having the lane marker 30 by rotating the steering wheel 60 clockwise during travel when the right rod 28 is aligned with the lane marker 30 of the road 32, rotating the steering wheel 60 counterclockwise during travel when the left rod 24 is aligned with the lane marker 30 of the road 32 and maintaining the position of the steering wheel 60 during travel when the center rod 26 is aligned with the lane marker 32 of the road 30. Therefore, the driving assistance device 16 assists a driver of the vehicle 10 in properly aligning the vehicle 10 on the road 32.

It will be readily appreciated by those skilled in the art that modifications may be made to the invention without departing from the concepts disclosed herein. Such modifications are to be considered as included in the following claims, unless these claims by their language expressly state otherwise.

I claim:

1. A driving assistance device for a vehicle having a dashboard and a windshield comprising:
   a housing adapted to be attached to the dashboard or the windshield of the vehicle, the housing having a top surface and a bottom surface adapted to be connected to the dashboard or the windshield;
   a left rod, a center rod and a right rod extending from the top surface of the housing, the rods being parallel, each of the rods having a light source at an end thereof; and
   electrical wiring within the housing and the rods for connecting the light sources to a power source for illuminating the light sources;
   wherein when the right rod overlaps a lane marker of a road, the vehicle is too close to the lane marker, when the left rod overlaps the lane marker of the road, the vehicle is too far away from the lane marker, and when the center rod overlaps the lane marker of the road, the vehicle is in the proper position, thereby allowing the driving assistance device to properly align the vehicle on the road; and
   wherein the rods can be used at daytime by aligning the rods with the lane marker of the road and at nighttime by illuminating the light sources and aligning light from the light sources with the lane marker of the road.

2. The driving assistance device of claim 1, further including:
   caps pivotally connected to the ends of each the rods;
   each of the caps including an aperture for allowing light from the light sources to exit the cap.

3. The driving assistance device of claim 2, further including:
   a power cord connectable to the housing, the power cord having a male plug adapter adapted to fit within a cigarette lighter in the vehicle;
   the power cord being connected to the wiring for supplying power from the cigarette lighter to the light sources to illuminate the light sources.

4. The driving assistance device of claim 2, further including:
   batteries located within the housing and connected to the wiring, the batteries supplying power to the light sources for illuminating the light sources.

5. The driving assistance device of claim 1, wherein:
   the housing includes one of the group consisting of a hook type fastener and a loop type fastener adapted to mate with a complementary loop type fastener or hook type fastener on the dashboard or the windshield of the vehicle for connecting the housing to the dashboard or the windshield.

6. The driving assistance device of claim 1, wherein:
   the housing includes suction cups for connecting the housing to the dashboard or the windshield.

7. The driving assistance device of claim 1, wherein:
   the center rod extends farther from the top surface of the housing than the left rod and the right rod.

8. The driving assistance device of claim 1, wherein:
   each of the rods has an annular cross section.

9. The driving assistance device of claim 8, wherein:
   each of the rods has a diameter of approximately 0.5 inches, thereby allowing the rods to be aligned with the lane marker without extending beyond the width of the lane marker.

10. In an automotive vehicle comprising a dashboard and a windshield, the improvement comprising:
    a housing having a top surface, the housing being connected to the dashboard or the windshield; and
    a left rod, a center rod and a right rod extending from the top surface of the housing, the rods being parallel;
    wherein when the right rod overlaps a lane marker of a road, the vehicle is too close to the lane marker, when the left rod overlaps the lane marker of the road, the vehicle is too far away from the lane marker, and when the center rod overlaps the lane marker of the road, the vehicle is in the proper position, thereby allowing the driving assistance device to properly align the vehicle on the road.

11. The improvement of claim 10, wherein:
    the rods each include a light source located at an end thereof; and
    the housing and the rods include electrical wiring for connecting the light sources to a power source for illuminating the light sources;
    wherein the rods can be used at daytime by aligning the rods with the lane marker of the road and at nighttime by illuminating the light sources and aligning light from the light sources with the lane marker of the road.

12. The improvement of claim 11, further including:
    caps pivotally connected to the ends of each the rods;
    each of the caps including an aperture for allowing light from the light sources to exit the cap.

13. The improvement of claim 12, further including:
    a power cord connectable to the housing, the power cord having a male plug adapter adapted to fit within a cigarette lighter in the vehicle;
    the power cord being connected to the wiring for supplying power from the cigarette lighter to the light sources to illuminate the light sources.

14. The improvement of claim 12, further including:
    batteries located within the housing and connected to the wiring, the batteries supplying power to the light sources for illuminating the light sources.

15. The improvement of claim 10, wherein:
    the housing includes a first fastener; and
    the vehicle includes a second fastener on the dashboard or the windshield of the vehicle for mating with the first fastener for removably connecting the housing to the dashboard or the windshield.

16. The improvement of claim 10, wherein:
    the housing includes suction cups for removably connecting the housing to the dashboard or the windshield.

17. The improvement of claim 10, wherein:
    the center rod extends farther from the top surface of the housing than the left rod and the right rod.

18. The improvement of claim 10, wherein:
    each of the rods has an annular cross section.

19. The improvement of claim 18, wherein:
each of the rods has a diameter of approximately 0.5 inches, thereby allowing the rods to be aligned with the lane marker without extending beyond the width of the lane marker.

20. A method of properly aligning a vehicle including a dashboard and a windshield on a road having a lane marker dividing the road into lanes, the method comprising:
providing a driving assistance device including a housing having a top surface and a bottom surface, the housing further including a first side rod, a center rod and a second side rod extending from the top surface of the housing, the rods being parallel;
placing a side of the vehicle directly adjacent any straight line;
aligning the first side rod of the driving assistance device with the straight line; and
connecting the bottom surface of the housing to the dashboard or the windshield of the vehicle;
wherein when the first side rod or the second side rod is aligned with the lane marker of the road, the vehicle is too close to or too far away from the lane marker, and when the center rod overlaps the lane marker of the road, the vehicle is in a safe position spaced from the lane marker.

21. The method of properly aligning a vehicle of claim 20, further including:
providing an end of each of the rods with a light source; and
providing the housing and the rods with electrical wiring for connecting the light sources to a power source for illuminating the light sources;
wherein the rods can be used at daytime by aligning the rods with the lane marker of the road and at nighttime by illuminating the light sources and aligning light from the light sources with the lane marker of the road.

22. The method of properly aligning a vehicle of claim 21, further including:
providing the housing with a power cord, the power cord being connected to the wiring in the housing and the rods, the power cord having a male plug adapter; and
inserting the male plug adapted into a cigarette lighter in the vehicle to supply power from the cigarette lighter to the light sources to illuminate the light sources.

23. The method of properly aligning a vehicle of claim 21, further including:
placing batteries within the housing for supplying power to the light sources for illuminating the light sources.

24. The method of properly aligning a vehicle of claim 20, wherein:
the step of connecting the bottom surface of the housing to the dashboard or the windshield of the vehicle includes:
providing the bottom surface of the housing with a first fastener;
providing the vehicle with a second fastener on the dashboard or the windshield of the vehicle; and
mating the first fastener with the second fastener to connect the housing to the dashboard or the windshield.

25. The method of properly aligning a vehicle of claim 20, wherein:
the step of connecting the bottom surface of the housing to the dashboard or the windshield of the vehicle includes:
providing the bottom surface of the housing with suction cups; and
attaching the suction cups of the bottom surface of the housing to the dashboard or the windshield of the vehicle.

26. The method of properly aligning a vehicle of claim 20, wherein:
the center rod extends farther from the top surface of the housing than the left rod and the right rod.

27. The method of properly aligning a vehicle of claim 20, wherein:
each of the rods has an annular cross section.

28. The method of properly aligning a vehicle of claim 27, wherein:
each of the rods has a diameter of approximately 0.5 inches, thereby allowing the rods to be aligned with the lane marker without extending beyond the width of the lane marker.

29. A method of properly aligning a vehicle including a steering wheel on a road having a lane marker dividing the road into lanes, the method comprising:
providing the vehicle with a left guide, a center guide and a right guide, the guides being parallel;
placing a left side of the vehicle directly adjacent any straight line;
aligning the right guide of the driving assistance device with the straight line;
rotating the steering wheel clockwise during travel when the right guide is aligned with the lane marker of the road;
rotating the steering wheel counterclockwise during travel when the left guide is aligned with the lane marker of the road; and
maintaining the position of the steering wheel during travel when the center guide is aligned with the lane marker of the road.

30. The method of properly aligning a vehicle of claim 29, further including:
providing the vehicle with a driving assistance device including a housing having a top surface and a bottom surface, the housing further including the left guide, the center guide and the right guide, the left guide being a first side rod, a center guide being a center rod and a right guide being a second side rod, the rods being parallel and extending from the top surface of the housing.

31. The method of properly aligning a vehicle of claim 30, further including:
providing an end of each of the rods with a light source; and
providing the housing and the rods with electrical wiring for connecting the light sources to a power source for illuminating the light sources;
wherein the rods can be used at daytime by aligning the rods with the lane marker of the road and at nighttime by illuminating the light sources and aligning light from the light sources with the lane marker of the road.

32. The method of properly aligning a vehicle of claim 31, further including:
providing the housing with a power cord, the power cord being connected to the wiring in the housing and the rods, the power cord having a male plug adapter; and
inserting the male plug adapted into a cigarette lighter in the vehicle to supply power from the cigarette lighter to the light sources to illuminate the light sources.

33. The method of properly aligning a vehicle of claim 31, further including:

placing batteries within the housing for supplying power to the light sources for illuminating the light sources.

34. The method of properly aligning a vehicle of claim 30, wherein:

the center rod extends farther from the top surface of the housing than the left rod and the right rod.

35. The method of properly aligning a vehicle of claim 30, wherein:

each of the rods has an annular cross section.

36. The method of properly aligning a vehicle of claim 35, wherein:

each of the rods has a diameter of approximately 0.5 inches, thereby allowing the rods to be aligned with the lane marker without extending beyond the width of the lane marker.

37. A method of properly aligning a vehicle including a steering wheel on a road having a lane marker dividing the road into lanes, the method comprising:

providing the vehicle with a left guide, a center guide and a right guide, the guides being parallel;

placing a right side of the vehicle directly adjacent any straight line;

aligning the left guide of the driving assistance device with the straight line;

rotating the steering wheel clockwise during travel when the right guide is aligned with the lane marker of the road;

rotating the steering wheel counterclockwise during travel when the left guide is aligned with the lane marker of the road; and maintaining the position of the steering wheel during travel when the center guide is aligned with the lane marker of the road.

38. The method of properly aligning a vehicle of claim 37, further including:

providing the vehicle with a driving assistance device including a housing having a top surface and a bottom surface, the housing further including the left guide, the center guide and the right guide, the left guide being a first side rod, a center guide being a center rod and a right guide being a second side rod, the rods being parallel and extending from the top surface of the housing.

39. The method of properly aligning a vehicle of claim 38, further including:

providing an end of each of the rods with a light source; and providing the housing and the rods with electrical wiring for connecting the light sources to a power source for illuminating the light sources;

wherein the rods can be used at daytime by aligning the rods with the lane marker of the road and at nighttime by illuminating the light sources and aligning light from the light sources with the lane marker of the road.

40. The method of properly aligning a vehicle of claim 39, further including:

providing the housing with a power cord, the power cord being connected to the wiring in the housing and the rods, the power cord having a male plug adapter; and inserting the male plug adapted into a cigarette lighter in the vehicle to supply power from the cigarette lighter to the light sources to illuminate the light sources.

41. The method of properly aligning a vehicle of claim 39, further including:

placing batteries within the housing for supplying power to the light sources for illuminating the light sources.

42. The method of properly aligning a vehicle of claim 38, wherein:

the center rod extends farther from the top surface of the housing than the left rod and the right rod.

43. The method of properly aligning a vehicle of claim 38, wherein:

each of the rods has an annular cross section.

44. The method of properly aligning a vehicle of claim 43, wherein:

each of the rods has a diameter of approximately 0.5 inches, thereby allowing the rods to be aligned with the lane marker without extending beyond the width of the lane marker.

* * * * *